US010442963B1

(12) United States Patent
Snyder, Jr. et al.

(10) Patent No.: US 10,442,963 B1
(45) Date of Patent: Oct. 15, 2019

(54) DURABLE AND HYDROPHOBIC POLYMERIC BINDER AND ADHESIVE

(71) Applicant: McTron Technologies, LLC, Greenville, SC (US)

(72) Inventors: Kenneth Loren Snyder, Jr., Mauldin, SC (US); Larry Milton McDaniel, Simpsonville, SC (US)

(73) Assignee: McTron Technologies, LLC, Greenville, SC (US)

( * ) Notice: Subject to any disclaimer, the term of this patent is extended or adjusted under 35 U.S.C. 154(b) by 0 days.

(21) Appl. No.: 15/386,889

(22) Filed: Dec. 21, 2016

Related U.S. Application Data

(60) Provisional application No. 62/270,781, filed on Dec. 22, 2015.

(51) Int. Cl.
| | | |
|---|---|---|
| *C09J 125/00* | (2006.01) | |
| *C09J 125/14* | (2006.01) | |
| *C09J 7/02* | (2006.01) | |
| *C09J 131/04* | (2006.01) | |
| *C09J 133/08* | (2006.01) | |

(Continued)

(52) U.S. Cl.
CPC ........... *C09J 125/14* (2013.01); *C09J 7/0217* (2013.01); *C09J 109/00* (2013.01); *C09J 123/06* (2013.01); *C09J 131/04* (2013.01); *C09J 133/08* (2013.01); *C09J 133/10* (2013.01); *D06N 3/0068* (2013.01); *D06N 3/042* (2013.01); *D06N 3/045* (2013.01); *C09J 2205/114* (2013.01); *D06N 2203/028* (2013.01); *D06N 2203/041* (2013.01); *D06N 2203/047* (2013.01)

(58) Field of Classification Search
CPC ..................................................... C09J 125/00
See application file for complete search history.

(56) References Cited

U.S. PATENT DOCUMENTS

| | | | |
|---|---|---|---|
| 3,297,620 | A | 1/1967 | Anderson |
| 3,488,311 | A | 1/1970 | Burdick |

(Continued)

FOREIGN PATENT DOCUMENTS

| | | |
|---|---|---|
| CA | 2395704 | 8/2010 |
| EP | 2222735 B1 | 1/2015 |

OTHER PUBLICATIONS

BASF, Stearyl Methacrylate 1618 F. (SMA 1618 F), Methacrylic acid ester for manufacturing polymers and for use as a feedstock for syntheses, Petrochemicals Specialty Monomers Technical Information, (Jul. 2013).

(Continued)

*Primary Examiner* — Andrew T Piziali
(74) *Attorney, Agent, or Firm* — Jeffrey T. Stover; Haynsworth Sinkler Boyd, P.A.

(57) ABSTRACT

A hydrophobic binder/adhesive, for treating a substrate, may include about 60% to 98.9% by weight bulk polymer selected from one or more monomers associated with styrene, vinyl acetate, acrylic acid ester, methacrylic acid esters, ethylene, or butadiene; about 0.1% to about 10.0%, by weight of one or more hydrophobic monomers selected from stearyl methacrylate or laurel acrylate; and about 1% to about 30%, by weight of one or more protective colloids associated with a hard resin polymer. The hydrophobic binder/adhesive may increase resistance to wetting of the substrate when expose to moisture, and increases durability of the substrate.

15 Claims, 5 Drawing Sheets

(51) Int. Cl.
  *C09J 133/10*  (2006.01)
  *C09J 123/06*  (2006.01)
  *C09J 109/00*  (2006.01)
  *D06N 3/04*  (2006.01)
  *D06N 3/00*  (2006.01)

(56) References Cited

U.S. PATENT DOCUMENTS

| | | | |
|---|---|---|---|
| 4,079,025 | A | 3/1978 | Young et al. |
| 4,219,454 | A * | 8/1980 | Iacoviello ............ C09D 131/04 524/812 |
| 4,900,777 | A * | 2/1990 | Ball ........................ C08F 14/06 524/819 |
| 4,912,169 | A | 3/1990 | Whitmire et al. |
| 4,923,514 | A | 5/1990 | Brown |
| 5,202,378 | A | 4/1993 | Barnett |
| 5,618,877 | A | 4/1997 | Tomlin et al. |
| 5,663,256 | A * | 9/1997 | Ariga ................... C07D 209/76 524/548 |
| 5,700,516 | A | 12/1997 | Sandvick et al. |
| 6,020,400 | A | 2/2000 | Anton et al. |
| 6,025,449 | A | 2/2000 | Enomoto et al. |
| 6,858,301 | B2 | 2/2005 | Ganapathiappan |
| 2003/0149133 | A1 | 8/2003 | Lau et al. |
| 2010/0093924 | A1 | 4/2010 | Lerschmacher et al. |
| 2012/0152459 | A1 | 6/2012 | Avramidis |
| 2012/0289628 | A1 | 11/2012 | Ceulemans et al. |

OTHER PUBLICATIONS

Rohm and Haas, Alkyl Esters Specifications (2007).

\* cited by examiner

DURABLE AND HYDROPHOBIC POLYMERIC BINDER AND ADHESIVE

REFERENCE

This application claims priority to U.S. Provisional Patent Application No. 62/270,781, filed Dec. 22, 2015, the entire contents of which are incorporated herein by reference.

BACKGROUND

Conventional polymeric binders are used today to repel water to enable substrate materials (e.g., corrugated paper products such as cardboard, etc.), treated with such binders, to retain their physical properties when exposed to small amounts of moisture. Such conventional polymeric binders tend to have some level of moisture sensitivity and have limitations with respect forming a strong adhesive bond with the substrate material (hereinafter, collectively referred to as "conventional binders").

Such conventional binders tend to lack durability, lack resistance to wetting of the substrate, and/or lose their adhesive properties when exposed to a significant amount of moisture, such as, for example, when subjected to precipitation, high humidity, shipping and handling, etc. This lack of durability enables the conventional binder to migrate (e.g., move within and/or on the surface of a substrate) when exposed to moisture, heat and/or friction (e.g., during normal shipping and handling, storage, etc.), which can cause the substrate to degrade, come apart or otherwise fail to maintain their structural integrity. Furthermore, conventional binders tend to migrate resulting in a weak bond with surfaces on and/or substrates within which they are intended to adhere. Additionally, conventional wax-based binders tend to lose their adhesive and water repellant characteristics on flexible surfaces (e.g., due to cracking, bond failure, etc.).

Additionally, other conventional binders, such as standard bulk polymers, tend to exhibit poor bonding qualities to surfaces that are traditionally difficult to adhere to, such as metal, glass, aluminum foil, hard plastic, etc. Such polymers can also have difficulty adhering to rigid surfaces and non-rigid surfaces. Standard bulk polymers developed to exhibit strong bonding qualities tend to permit wetting of the substrate and, thus, exhibit only limited hydrophobic properties.

Conventional binders are usually made using a surfactant-stabilized emulsion polymerization process that includes providing an emulsified monomer mix into a polymerization vessel. The monomer is usually emulsified with a mixture of nonionic and anionic surfactants, which provide stability to the emulsified droplet as well as the final latex spheres. However, such conventional binders are water-sensitive materials and do not prevent re-wetting of the dried polymer films.

Thus, what is needed is a binder and/or adhesive that possesses strong hydrophobicity that resists and/or precludes wetting of the substrate material while exhibiting strong bonding qualities with flexible or rigid substrates, increased durability, greater peel strength, and resistance to migration within the substrate when exposed to moisture, heat, or friction.

SUMMARY

According to one implementation, described herein, a hydrophobic binder/adhesive for treating a substrate may include about 60.0% to about 98.9% by weight bulk polymer selected from one or more monomers associated with styrene, vinyl acetate, acrylic acid ester, methacrylic acid esters, ethylene, or butadiene; about 0.1% to about 10.0% by weight of one or more hydrophobic monomers selected from one or more of stearyl methacrylate, laurel acrylate, or vinyl versatate; and about 1% to about 30.0% by weight of one or more protective colloids associated with a hard resin polymer. The hydrophobic binder/adhesive may increase resistance to wetting of the substrate when expose to moisture, and may increase durability of the substrate.

According to another implementation, described herein, a hydrophobic substrate may include a substrate; and a binder that is used to treat the substrate. The binder may include a major amount of a conventional polymeric binder, and a minor amount of a hydrophobic binder/adhesive. The minor amount of the hydrophobic binder/adhesive may include about 60.0% to about 98.9% by weight bulk polymer selected from one or more monomers associated with styrene, vinyl acetate, acrylic acid ester, methacrylic acid esters, ethylene, or butadiene; about 0.1% to about 10.0% by weight of one or more hydrophobic monomers selected from one or more of stearyl methacrylate, laurel acrylate, or vinyl versatate; and about 1% to about 30.0% by weight of one or more protective colloids associated with a hard resin polymer.

According to yet another implementation, described herein, a hydrophobic binder/adhesive may include about 60.0% to about 98.9% by weight bulk polymer selected from one or more monomers associated with styrene, vinyl acetate, acrylic acid ester, methacrylic acid esters, ethylene, or butadiene; about 0.1% to about 10.0%, by weight of one or more hydrophobic monomers selected from one or more of stearyl methacrylate, laurel acrylate, or vinyl versatate; and about 1% to about 30.0%, by weight of one or more protective colloids, associated with a hard resin polymer, selected from styrene maleic anhydride ("SMA") or poly (acrylic acid-co-alpha-methylstyrene-co-styrene).

DETAILED DESCRIPTION

FIGS. 1A-4 are attached thereto and incorporated herein by this reference. The following detailed description refers to the accompanying FIGS. 1A-4. The same reference numbers in different figures may identify the same or similar elements.

The systems, methods, technologies, techniques, and/or compositions described herein (collectively, "technologies"), may include a polymer that can be used as a Hydrophobic Binder/Adhesive with characteristics, described herein, that are not generally exhibited by standard bulk polymers and/or conventional binders. The Hydrophobic Binder/Adhesive may be formed by combining a bulk polymer such as, in a non-limiting example, styrene, vinyl acetate, acrylic acid esters, methacrylic acid esters, ethylene, butadiene, etc. with a particular type of hydrophobic monomer described herein to create a Hydrophobic polymer that exhibits increased hydrophobicity in combination with a number of unexpected characteristics that are surprisingly different than those exhibited by standard bulk polymers and/or conventional polymeric binders stronger adhesion, higher peel strength, greater resistance to migration, greater durability, greater resistance to tearing or breakage in wet and dry conditions, and comparable flexibility (hereinafter, referred as "Hydrophobic Binder/Adhesive") relative to those characteristics associated with conventional binders or bulk polymers. Typically, combining a hydrophobic monomer with a bulk polymer to increase hydrophobicity tends to exhibit comparatively weak or marginal adhesion to substrates, poor peel strength, lack of flexibility, low resistance to migration, lack of durability, and low wet or dry resistance to tearing or breakage, etc.

In a non-limiting example, the Hydrophobic Binder/Adhesive may include a known bulk polymer based on monomers such as, in a non-limiting example, styrene, vinyl acetate, acrylic acid esters, methacrylic acid esters, ethylene, butadiene, etc. The bulk polymer may be combined with a hydrophobic specialty monomer, selected from one or more of stearyl methacrylate, laurel acrylate, vinyl versatate, etc., associated with a carbon length from between C10 to C25 (e.g., C20 preferred) (hereinafter, "Hydrophobic Monomer"). The amount of Hydrophobic Monomer to be combined with the bulk polymer may be from about 0.1% to 10% by weight of the Hydrophobic Monomer and/or preferably between 0.5% and 3%. Combining the amount of Hydrophobic Monomer with the bulk polymer may be performed at little to no cost that enables the cost of the Hydrophobic Binder/Adhesive to be comparable to that of the bulk polymer.

Additionally, or alternatively, the Hydrophobic Monomer may be combined with the bulk polymer through a surfactant-supported emulsion polymerization process. This process may include combining the bulk polymer and the Hydrophobic Monomer mixture into a polymerization vessel and emulsifying with a mixture of nonionic and anionic surfactants such as, for example, alkyl phenol ethoxylates, linear alcohol ethoxylates, alkyl sulfates (e.g., sodium lauryl sulfate, etc.), alkyl phosphates and/or alkyl ether phosphates, co-polymerizable organosulphur surfactants (e.g., sodium vinyl sulfonate, etc.), co-polymerizable allyl sulfonates (e.g., sodium methallyl sulfonate, etc.), etc. to cause the Hydrophobic Monomer to be arranged randomly, periodically, and/or at regular intervals within the backbone of the bulk polymer. Such an arrangement may enable the Hydrophobic Monomer to be distributed throughout the bulk polymer and within a substrate material (e.g., corrugated board, paper, pulp, textile, etc.) impregnated and/or coated with the Hydrophobic Binder/Adhesive to maximize the hydrophobicity, durability, peel strength, and adhesion properties of the Hydrophobic Binder/Adhesive.

Additionally, or alternatively, the properties of the Hydrophobic Binder/Adhesive may be further improved by eliminating the aforementioned surfactants from the formulation and process and combining the bulk polymer and Hydrophobic Monomer, with a "protective colloid" through a hard resin-supported emulsion polymerization process. Eliminating the aforementioned surfactants from the formulation and, incorporating the protective colloid may enable the viscosity of the protective colloid to stabilize the mixture rather than anionic charge of the surfactants. In a non-limiting example, the protective colloid may include hard resins of methacrylate, styrene maleic anhydride ("SMA"), and, preferably, poly(acrylic acid-co-alpha-methylstyrene-co-styrene) that are not water soluble, but are soluble at high pH. While the description below describes the Hydrophobic Binder/Adhesives being used to treat a substrate associated with corrugated paper products such as cardboard, the substrates and uses of the Hydrophobic Binder/Adhesives need not be so limited. Such treatment may correspond to a coating on or impregnation within a substrate associated with paper products such as cardboard, composites, fabrics, textiles, fiberglass, wood, etc. In other implementations, the Hydrophobic Binder/Adhesive may be used as a Hydrophobic and water resistant adhesive, caulk, filler, paint, filler, etc. to bond to a substrate such as a paper product, cardboard, fiberglass, fabric (nonwoven or other), wood, metal, plastics and polymers, etc., and/or to bond two substrates or articles together. Additionally, or alternatively, the Hydrophobic Binder/Adhesive may be used as an ink or ink additive to enable inks to bond to different substrates, resist migration, smearing, disbanding, etc. The Hydrophobic Binder/Adhesive may be used in a variety of other applications including, for example, durable and water resistant adhesives, coatings, paints, inks, textile coatings (e.g., used in composites), caulks, latex (e.g., sprays, foams, dips, etc.), acrylic automotive components (e.g., as a substitute for urethanes, epoxies, etc.), etc.

Figure 1A:
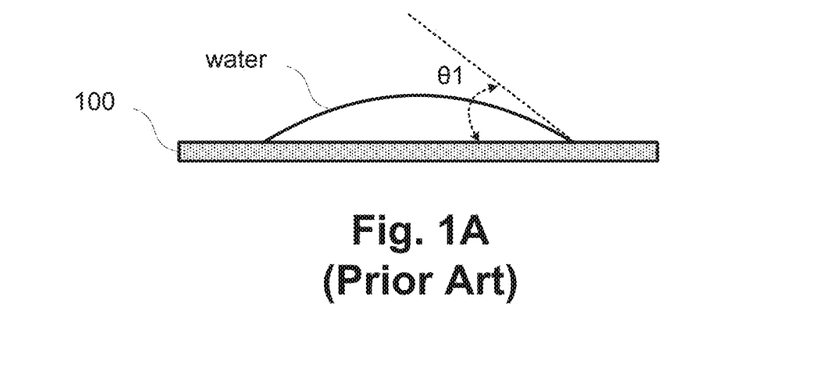
FIGS. 1A and 1B are a diagram and image, respectively, of a conventional substrate, treated with a conventional binder that may not resist wetting in the presence of moisture.
Figure 1B:
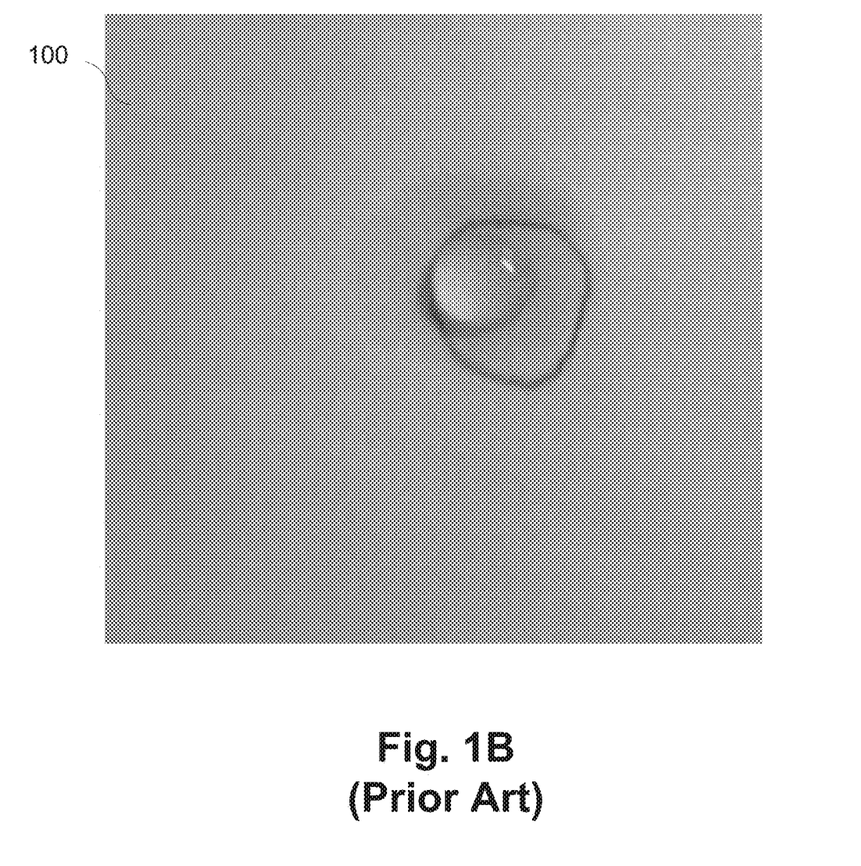

FIGS. 1A and 1B are a diagram and image, respectively, of conventional substrate 100 that includes a substrate that has been treated (e.g., coated, impregnated, etc.) with a conventional binder. In a non-limiting example, conventional substrate 100 may include a substrate (e.g., corrugated paper products such as cardboard, etc.), that is coated and/or impregnated with a known wax-, starch-, thermoset-, latex-, etc. based binder. Conventional substrate 100 may include a water droplet on a surface thereof and may not prevent the water droplet from wetting (e.g., being absorbed by) conventional substrate 100 treated with the conventional binder. As shown in FIG. 1A, the surface energy of a conventional substrate 100 may not sufficiently resist wetting by the water droplet. Such lack of resistance to wetting can be shown by the first contact angle (e.g., shown as θ1 in FIG. 1A) at the intersection of the surface of the water droplet and that of the conventional substrate 100. Contact angles less than 90 degrees may indicate that conventional substrate 100 is absorbing all or a portion of the water droplet and/or that conventional substrate 100 is hydrophilic.

Such wetting may be further illustrated in FIG. 1B, which includes a water droplet on the surface of conventional substrate 100 that is coated and/or impregnated with the conventional binder. As shown in FIG. 1B, a portion of the water droplet has been absorbed by, has penetrated into and/or has otherwise caused conventional substrate 100 to become wetted. In one non-limiting example, water absorptive testing for a particular conventional substrate 100 (e.g., comprised of paper and a standard styrene acrylate coating), may indicate a tendency to absorb water with measured Cobb value greater than 50. Such Cobb value may indicate that the particular conventional substrate 100 has increased in weight due to water absorption. Water absorption, such as that described immediately above may cause the durability of conventional substrate 100 to degrade, and/or may decrease and/or compromise the structural characteristics of conventional substrate 100.

Figure 2A:
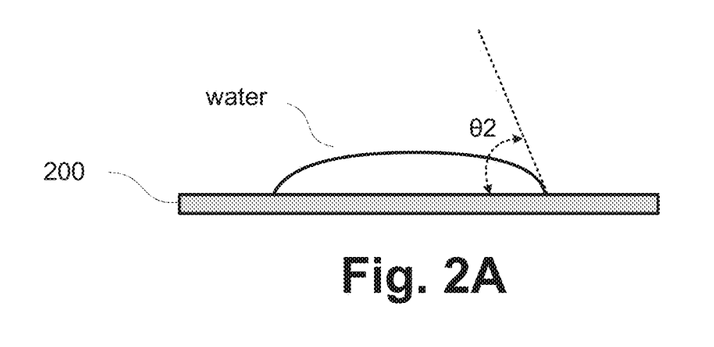
FIGS. 2A and 2B are a diagram and image, respectively, of a substrate, treated with a Hydrophobic Binder/Adhesive, that may resist wetting when exposed to moisture.
Figure 2B:
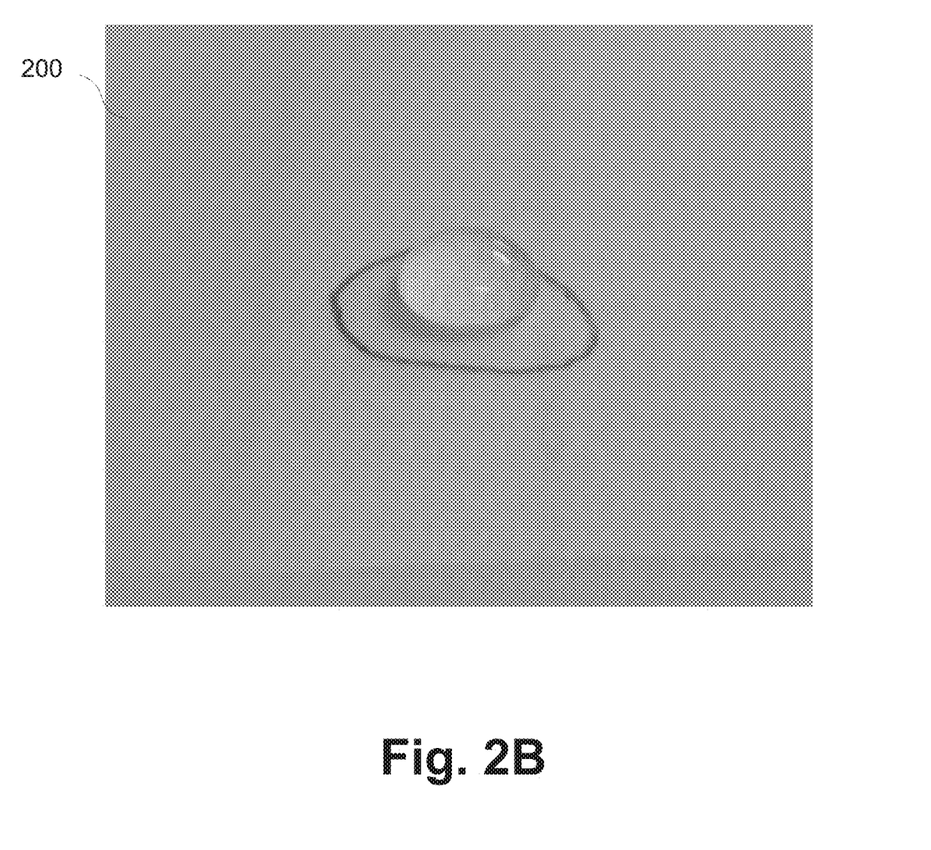

FIGS. 2A and 2B are a diagram and image, respectively, of a substrate, treated with a Hydrophobic Binder/Adhesive that may resist wetting when exposed to moisture. The Hydrophobic Binder/Adhesive may be formed by a bulk polymer and a Hydrophobic Monomer using a surfactant-supported emulsion polymerization process. The bulk polymer may be formed by monomers such as, in a non-limiting example, styrene, vinyl acetate, acrylic acid esters, methacrylic acid esters, ethylene, butadiene, etc. A major amount of the bulk polymer may be combined with a minor amount of Hydrophobic Monomer selected from one or more of stearyl methacrylate, laurel acrylate, vinyl versatate, etc., associated with a carbon length from between C10 to C25 (e.g., C20 preferred). The amount of bulk polymer may be from about 90% to about 99.9% by weight of the bulk polymer and/or preferably between about 97% and about 99.5% by weight of the bulk polymer. The amount of Hydrophobic Monomer that is combined with the bulk polymer may be from about 0.1% to about 10% by weight of the Hydrophobic Monomer and/or preferably between about 0.5% and about 3.0% by weight of the Hydrophobic Monomer. Additional ingredients such as fillers, thickeners, etc. (e.g., talc, silica, calcium carbonate, kaolin clay, etc.) may be added which may reduce the percentage of bulk polymer by weight. For example, incorporating a small amount of Hydrophobic Monomer with the bulk polymer may be performed at little to no cost that enables the cost of the Hydrophobic Binder/Adhesive to be comparable to that of the bulk polymer. The amount of Hydrophobic Monomer to be combined with the bulk polymer may be from about 0.1% to 10% by weight of the Hydrophobic Monomer and/or preferably between 0.5% and 3%.

Additionally, or alternatively, the Hydrophobic Monomer may be combined with the bulk polymer through a surfactant-supported emulsion polymerization process. This process may include combining the bulk polymer and the Hydrophobic Monomer mixture into a polymerization vessel and emulsifying with a mixture of nonionic and anionic surfactants such as, for example, alkyl phenol ethoxylates, linear alcohol ethoxylates, alkyl sulfates (e.g., sodium lauryl sulfate, etc.), alkyl phosphates and/or alkyl ether phosphates, co-polymerizable organosulphur surfactants (e.g., sodium vinyl sulfonate, etc.), co-polymerizable allyl sulfonates (e.g., sodium methallyl sulfonate, etc.), etc. to cause the Hydrophobic Monomer to be arranged randomly, periodically, and/or at regular intervals within the backbone of the bulk polymer. The most common type of emulsion polymerization is an oil-in-water emulsion, in which droplets of monomer (the oil) are emulsified (with surfactants) in a continuous phase of water. Such polymers are composed primarily of commodity bulk monomers. These reactions are normally initiated with organic peroxides or persulfates. Small amounts of specialty monomers can be incorporated into such polymers. The specialty monomers are expensive but provide specific attributes. They can also include a self-crosslinking or internal cross-linking monomer. They are run at elevated temperatures and normally use delayed feeds as the reaction itself is exothermic.

Such an arrangement may enable the Hydrophobic Monomer to be distributed throughout the bulk polymer and within a substrate material (e.g., corrugated board, paper, pulp, textile, etc.) impregnated and/or coated with the Hydrophobic Binder/Adhesive to maximize the hydrophobicity, durability, peel strength, and adhesion properties of the Hydrophobic Binder/Adhesive.

Substrate 200 that may prevent a water droplet on a surface thereof from wetting substrate 200 treated with the Hydrophobic Binder/Adhesive. Furthermore, substrate 200 with the Hydrophobic Binder/Adhesive treatment is wash-durable and does not extract or wash out with repeated cycles.

As shown in FIG. 2A, the Hydrophobic Binder/Adhesive may modify the surface energy of substrate 200 (e.g., as compared to that of conventional substrate 100 associated with the conventional binder) to provide greater resistance to wetting as shown in FIG. 2A. The greater resistance to wetting can be shown by the second contact angle (e.g., shown as θ2 in FIG. 1B) at the intersection of the surface of the water droplet and that of substrate 200. Additionally, or alternatively, the greater resistance to wetting of substrate 200 caused by the change in surface energy, can be shown by the second contact angle (e.g., θ2) approaching orthogonality and/or being greater than the first contact angle (e.g., θ2>θ1) between the water and conventional substrate 100. The change in surface energy may increase the hydrophobicity of substrate 200 that is formed using the Hydrophobic Binder/Adhesive. Such wetting is also, or alternatively, illustrated in FIG. 2B, which includes a water droplet on the surface of substrate 200 that is coated and/or impregnated with the Hydrophobic Binder/Adhesive. As shown in FIG. 2B, the water droplet has not been absorbed by, has not penetrated into and/or has otherwise not caused substrate 200 to become wetted. Preventing such absorption, penetration and/or wetting may enable the durability of substrate 200 to improve, and/or may preclude the structural characteristics of substrate 200 from decreasing or becoming compromised.

Figure 2C:
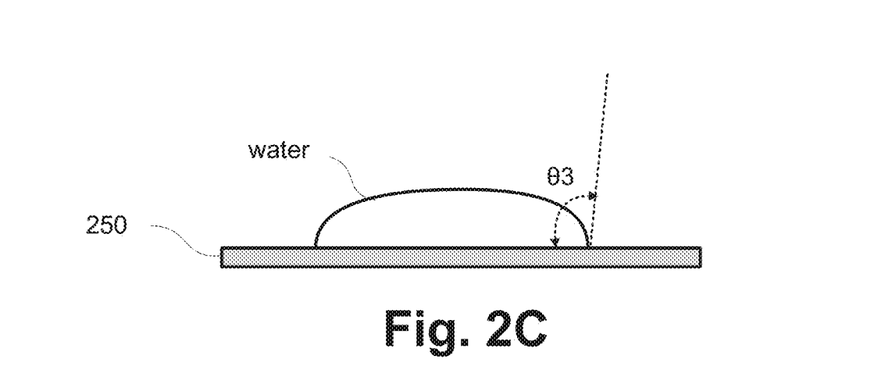
FIGS. 2C and 2D is a diagram and image, respectively, of another substrate, treated with a Hydrophobic Binder/Adhesive that includes a protective colloid, that may further resist wetting when exposed to moisture.
Figure 2D:
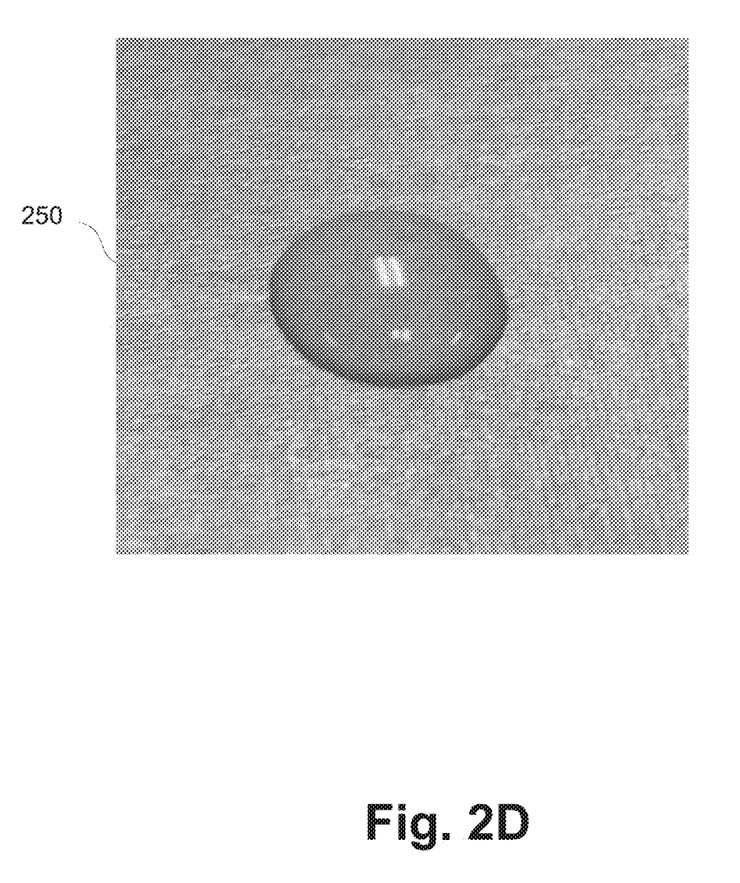

FIGS. 2C and 2D is a diagram of are a diagram and image, respectively, of substrate 250, treated with a Hydrophobic Binder/Adhesive that includes one or more protective colloids that may further resist wetting when exposed to moisture. The Hydrophobic Binder/Adhesive associated with substrate 250 (sometimes referred to hereinafter as a "second Hydrophobic Binder/Adhesive" to distinguish from the "first Hydrophobic Binder/Adhesive" described above in connection with FIGS. 2A and 2B), may be formed by a major amount of bulk polymer, a minor amount of one or more Hydrophobic Monomers as described above with respect to FIGS. 2A and 2B, and a minor amount of one or more protective colloids using a hard resin-supported emulsion polymerization process that does not include the surfactants described above with respect to FIGS. 2A and 2B. The bulk polymer may be formed by one or more monomers such as, in a non-limiting example, styrene, vinyl acetate, acrylic acid esters, methacrylic acid esters, ethylene, butadiene, etc. The amount of bulk polymer may be from about 60.0% to about 98.9% by weight of the bulk polymer and, preferably, from about 77.0% to 89.5% by weight of the bulk polymer. The bulk polymer may be combined with a Hydrophobic Monomer selected from one or more of stearyl methacrylate, laurel acrylate, vinyl versatate, etc., associated with a carbon length from between C10 to C25 (e.g., C20 preferred). The amount of Hydrophobic Monomer to be combined with the bulk polymer may be from about 0.1% to about 10.0% by weight of the Hydrophobic Monomer and, preferably, from about 0.5% to about 3.0% by weight of the Hydrophobic Monomer.

Eliminating the aforementioned surfactants from the formulation and, incorporating one or more hard resin protective colloids may enable the in-process viscosity of the protective colloid from about 100 centipoise (cP) to about 8000 cP, and preferably from about 1000 cP to about 3000 cP) at 25 degrees Celsius to stabilize the mixture and prevent settling via mechanical means rather than via anionic charge of surfactants as described above in connection with the surfactant-supported emulsion polymerization process of FIGS. 2A and 2B. In a non-limiting example, the one or more protective colloids may be selected from hard resins of styrene maleic anhydride ("SMA"), and, preferably, poly (acrylic acid-co-alpha-methylstyrene-co-styrene). The minor amount of protective colloid to be combined with the major amount of bulk polymer and the minor amount of Hydrophobic Monomer may be from about 1.0% to about 30.0% by weight of the protective colloid and, preferably, from about 10.0% to about 20.0% by weight of the protective colloid.

Combining the amount of Hydrophobic Monomer and protective colloid with the bulk polymer through the hard resin-supported emulsion polymerization process may be performed at little cost that enables the cost of the Hydrophobic Binder/Adhesive to be comparable to that of the bulk polymer and/or a conventional polymer binder.

Additionally, or alternatively, the Hydrophobic Monomer may be combined with the bulk polymer through a hard resin-supported and surfactant-free emulsion polymerization process. For example, water-soluble polymers, such as certain polyvinyl alcohols ("PVOH") or hydroxyethyl celluloses ("HEC"), can also be used to act as emulsifiers/ stabilizers. These materials may replace the surfactants which function via an adsorption and charge repulsion mechanism. The protective colloids function via both a surface coverage method that can also include grafting. This type of stabilizer may have the added value akin to thickened water that more readily suspends sub-micron particles which are slightly denser than water itself.

Water-soluble polymers such as HEC and PVOH remain re-wettable (as do surfactants) after such polymer films have dried and coalesced. There is a family of alkali-soluble colloids, which do not readily re-wet after the volatile base used to neutralize their acid groups evaporates. Such family of hard resins is composed of styrene/alpha-methyl styrene/ maleic anhydride. They readily dissolve when pH is raised above 7.5. The family of styrene-maleic anhydride-amine polymers are known protective colloids that are superior in water resistance. The family of amine neutralized alpha-olefin—maleic anhydride copolymers are known to have also been used similarly and include material such as ethylene-maleic anhydride.

The hard resin-supported emulsion polymerization process that is used to produce the second Hydrophobic Binder/ Adhesive may enable the Hydrophobic Monomer and protective colloid to be distributed throughout the bulk polymer that is used to treat a substrate material (e.g., corrugated board, paper, pulp, textile, etc.) by impregnating and/or coating to maximize the hydrophobicity, durability, peel strength, resistance to migration, resistance to tearing and/or breakage, and adhesion properties of the second Hydrophobic Binder/Adhesive over that of the first Hydrophobic Binder/Adhesive described in FIGS. 2A and 2B.

Substrate 250 may prevent a water droplet on a surface thereof from wetting substrate 250 that is treated with the Hydrophobic Binder/Adhesive that includes the protective colloid. For example, as shown in FIG. 2C, the Hydrophobic Binder/Adhesive may further modify the surface energy of substrate 250 (e.g., as compared to that of conventional substrate 100 of FIGS. 1A and 1B, and substrate 200 of FIGS. 2A and 2B) to provide greater resistance to wetting as shown in FIG. 2C. The greater resistance to wetting can be shown by the third contact angle (e.g., shown as θ3 in FIG. 2C) at the intersection of the surface of the water droplet and that of substrate 250. Additionally, or alternatively, the greater resistance to wetting of substrate 250 caused by the change in surface energy, can be shown by the third contact angle (e.g., θ3) being greater than 90 degrees and/or being greater than the first contact angle and second contact angle (e.g., θ3>θ2>θ1) between the water droplet, and substrate 200 and conventional substrate 100. The change in surface energy may increase the hydrophobicity of substrate 250 that is formed using the Hydrophobic Binder/Adhesive. Such wetting is also, or alternatively, illustrated in FIG. 2D, which includes a water droplet on the surface of substrate 250. As shown in FIG. 2D, the water droplet may not have been absorbed by, has not penetrated into and/or has otherwise not caused substrate 250 to become wetted. Preventing such absorption, penetration and/or wetting may enable the durability of substrate 250 to improve, and/or may preclude the structural characteristics of substrate 250 from decreasing or becoming compromised.

The Hydrophobic Monomer described with respect to FIGS. 2A-2D may modify certain properties associated with the bulk polymer to enable the Hydrophobic Binder/Adhesive to exhibit an increase in hydrophobicity relative to the bulk polymer and/or conventional binder. As described above with respect to FIGS. 2A-2D, the Hydrophobic Binder/Adhesive may affect the surface energy of substrates 200 and 250 to enable the substrates to provide greater resistance to wetting than the conventional substrate 100.

Additionally, or alternatively, the Hydrophobic Binder/ Adhesive described in connection with FIGS. 2A-2D, may be more durable than the conventional binder and may resist migration in the presence of moisture, mechanical stress (e.g., binding, friction, etc.) and/or heat. Such durability and resistance to migration has been shown by the inventors in wash resistance studies conducted on various upholstery fabrics.

The Hydrophobic Binder/Adhesive described in connection with FIGS. 2A-2D may, for example, change the surface energy of a substrate in a manner that enables the substrate to resist wetting even when subjected to moisture, mechanical stress (e.g., such as bending, friction, etc.), or heat. Such characteristics (e.g., improved resistance to wetting, improved durability, increased peal strength, improved adhesion, etc.) may enable the Hydrophobic Binder/Adhesive to be used as a low cost, water-resistant binder for use in the manufacture of corrugated board and other paper-based products and substrates (e.g., card board, boxes, packaging, etc.). Such substrates may be manufactured in a manner that causes the constituent pulp of corrugated board to be impregnated and/or coated with the Hydrophobic Binder/Adhesive to create a durable substrate.

Figure 3:
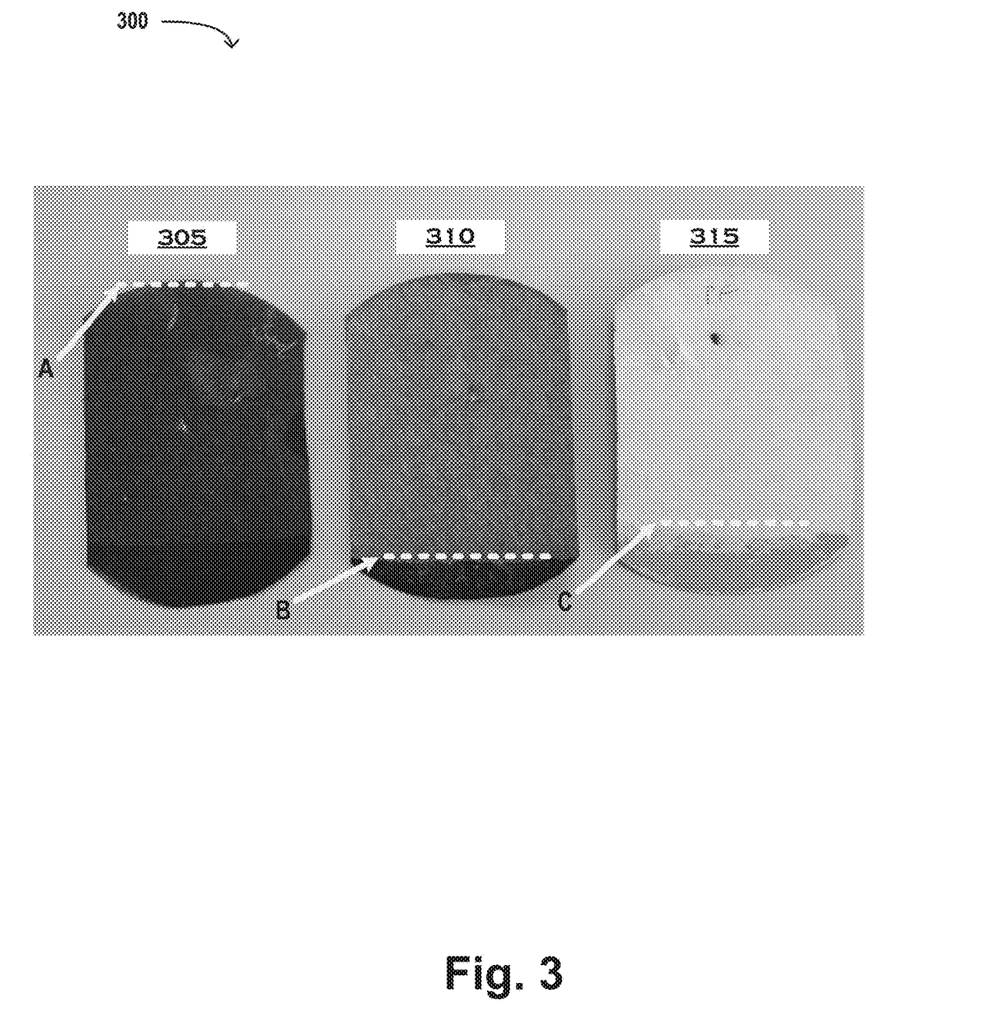
FIG. 3 is an image that may depict wicking properties of example substrates treated with a conventional binder of FIGS. 1A and 1B, and a substrate that may be treated with a major amount of the conventional binder and a minor amount of the Hydrophobic Binder/Adhesive of FIGS. 2C and 2D.

In another non-limiting example, the resistance to wetting of substrate 250 may be further illustrated in the ability of substrate 250 to resist wicking when in direct contact with water as illustrated in FIG. 3. FIG. 3 is an image 300 that may depict wicking properties of example substrates 305 and 315 that are treated with conventional binders, and a substrate 310 that is treated with a major amount of the conventional binder used in substrate 305 and a minor amount of the second Hydrophobic Binder/Adhesive of FIGS. 2C and 2D. Substrate 305 may include a composite that has been saturated with a conventional binder that may be a 100% bio-renewable thermoset resin (305); substrate 310 may include a composite that has been saturated with a mixture of 98% bio-renewable thermoset resin with 2% of the second Hydrophobic Binder/Adhesive; and substrate 315 may include a composite saturated with a 100% conventional formaldehyde-based thermoset resin. Phenol formaldehyde resin is known to be particularly harmful to the environment. A minor amount, from about 0.1% to about 10% by weight of the second Hydrophobic Binder/Adhesive, and preferably from about 1% to about 3% by weight of the second Hydrophobic Binder/Adhesive may render a readily re-wettable bio-renewable resin and/or conventional binder (from about 90% to about 99.9% by weight, or preferably from about 97% to about 99% by weight) less water sensitive than the conventional thermosets used specifically for water resistance.

As discussed in the preceding paragraph, substrate 310 may be treated with (e.g., coated by, impregnated with, etc.) a major amount (e.g., 98% by weight) of the bio-renewalbe sugar-based thermoset resin combined with a minor amount of (e.g., 2% by weight) of the second Hydrophobic Binder/Adhesive, of FIGS. 2C and 2D. The example above is intended to be non-limiting, such that the major amount of sugar-based thermoset resin may be combined with the minor amount of Hydrophobic Binder/Adhesive of FIGS. 2C and 2D in amounts that are different than the 98% and 2% by weight, respectively. The bottom portion of each of conventional substrates 305 and 315, and substrate 310 may be dipped in water for a period of time (e.g., 30 seconds, 1 minute, 5 minutes, 10 minutes, 30 minutes, 1 hour, etc.) to allow the water to wick up and/or into each of the substrates. As shown in FIG. 3, conventional substrate 305 wicked from the bottom to the top as shown by the dashed line labeled "A." Substrate 310 wicked from the bottom and up only a short distance to the dashed line labeled "B." The amount of wicking of Substrate 310 is substantially less than that of conventional substrate 305, which may indicate that substrate 310 may be significantly more resistant to moisture absorption, penetration, wetting or wicking than conventional substrate 305. Similarly, substrate 310 exhibited improved properties over conventional substrate 315 which may indicate that substrate 310 may be significantly more resistant to moisture absorption, penetration, wetting or wicking than conventional substrate 315 and may be better for the environment.

Figure 4:
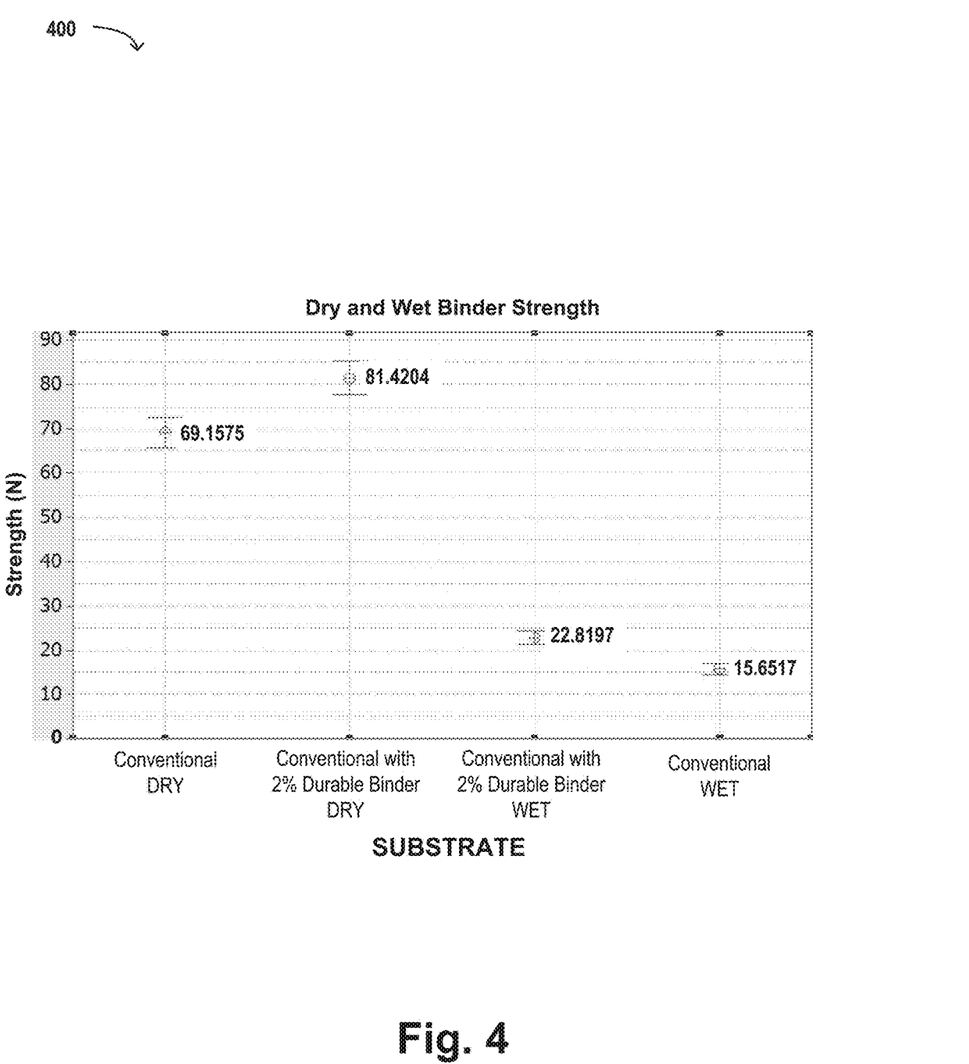
FIG. 4 is a diagram that depicts example dry and wet tensile strength of a substrate treated with a conventional binder of FIGS. 1A and 1B, and a substrate treated with a major amount of the conventional substrate and a minor amount of Hydrophobic Binder/Adhesive of FIGS. 2C and 2D.

Turning now to FIG. 4, the Hydrophobic Binder/Adhesive may exhibit unexpected properties of superior peel strength and durability compared to conventional binders and/or adhesives. The Hydrophobic Binder/Adhesive, of FIGS. 2A-2D may exhibit such unexpected properties of increased peel strength and adhesion on traditionally difficult-to-adhere surfaces as well as flexible and/or rigid surfaces. Such unexpected improvements in peal strength and adhesion properties have been observed when the Hydrophobic Binder/Adhesive is dried in metal weighing tins that normally release the polymer film. The Hydrophobic Binder/Adhesive could not be removed or released from the tins and was permanently adhered to the surface thereof. Other durability tests were performed on the Hydrophobic Binder/Adhesive of FIG. 3 as illustrated in FIG. 4. FIG. 4 is a diagram 400 that depicts example dry and wet tensile strength of a substrate treated with a conventional binder of FIGS. 1A and 1B, and a substrate treated with a major amount of the conventional substrate and a minor amount of Hydrophobic Binder/ Adhesive of FIGS. 2C and 2D. Diagram 400, may identify, along a horizontal axis labeled "SUBSTRATE," a substrate treated with a conventional binder (e.g., such as a sugar-based thermoset resin polymer) in a dry state that has not been exposed to moisture (e.g., shown as "Conventional, Dry"); a substrate treated with a binder based on a major amount (e.g., 98% by weight) of the conventional binder and a minor amount (e.g., 2% by weight) of the Hydrophobic Binder/Adhesive of FIGS. 2C and 2D in a dry state that has not been exposed to moisture (e.g., shown as "Conventional with 2% Hydrophobic Binder, Dry"); a substrate treated with a binder that is based on the major amount (e.g., 98% by weight) of the conventional binder and a minor amount (e.g., 2% by weight) of the Hydrophobic Binder/Adhesive of FIGS. 2C and 2D in a wet state that has been exposed to moisture (e.g., shown as "Conventional with 2% Hydrophobic Binder, Wet"); and a substrate treated with the conventional binder (e.g., such as a sugar-based thermoset resin polymer) in a wet state that has been exposed to moisture (e.g., shown as ""Conventional, Wet"). Diagram 400, may also identify, along a vertical axis labeled "Strength (N)," the strength of the substrates identified on the horizontal axis in units of force (e.g., shown as newtons ("N"), but could be expressed in other units of force) in a scale, in a non-limiting example, ranging from zero to 90 newtons. The strength may correspond to a tensile strength test that imparts on the above-identified substrates an amount of tensile force or tension required to cause breakage and/or damage to the substrates in a dry and wet state. As shown in diagram 400, the strength of the first substrate in the dry state (e.g., Conventional, Dry) may be approximately 69.1575 N; and the second substrate in the dry state (e.g., Conventional with 2% Hydrophobic Binder, Dry) may be approximately 81.420 N. The difference in dry strength between the first substrate with the conventional binder and the second substrate with the 2% Hydrophobic Binder/Adhesive may represent approximately a 17% increase in tensile strength of the second substrate over that of the first substrate. Additionally, as shown in diagram 400, the strength of the first substrate in the wet state (e.g., Conventional, Wet) may be approximately 15.6517 N; and the second substrate in the wet state (e.g., Conventional with 2% Hydrophobic Binder, Wet) may be approximately 22.8197 N. The difference in wet strength between the first substrate with the conventional binder and the second substrate with the 2% Hydrophobic Binder/Adhesive may represent approximately a 46% increase in tensile strength of the second substrate over that of the first substrate.

Although the Hydrophobic Binder/Adhesive described herein is described primarily in the context of a binder, binder additive or coating for corrugated paper products such as cardboard, paper, etc., the Hydrophobic Binder/Adhesive need not be so limited. For example, the Hydrophobic Binder/Adhesive may be used in a variety of applications including, for example, durable and water resistant adhesives, coatings, paints, inks, textile coatings (e.g., used in composites), caulks, latex (e.g., sprays, foams, dips, etc.), acrylic automotive components (e.g., as a substitute for urethanes, epoxies, etc.), etc.

In a non-limiting example, the Hydrophobic Binder/Adhesive described in connection with FIGS. 2A-2D, may be used as a water-resistant binder for use in the manufacture of corrugated board. In this example, the Hydrophobic Binder/Adhesive may be combined with a standard starch-based polymer and/or other conventional binders, and coated and/or impregnated into the corrugated board by an industrial corrugator. In this application, the binder itself may possess the hydrophobic properties which do not migrate to the surface of the board. Preventing the migration of the binder and/or hydrophobic properties may enable the water resistance and durability of the board to be maintained even when repeatedly exposed to moisture. Maintaining the durability and water resistance of the board may enable the treated board and/or any article constructed therefrom (e.g., packaging, boxes, etc.) to maintain its structural integrity for a longer period of time than conventional board even when the exposed to water.

Additionally, or alternatively, the Hydrophobic Binder/Adhesive described in connection with FIGS. 2A-2D, may be used in one or more other applications, such as, for example, durable and water resistant adhesives and caulks. In this example, the Hydrophobic Binder/Adhesive may be in the form of a paste or flowable gum for application as an adhesive or glue. Such an application may be effective in packaging, consumer products, construction, etc.

Additionally, the Hydrophobic Binder/Adhesive described in connection with FIGS. 2A-2D, may be in the form of durable and water-resistant coatings, paints, inks, and/or pigments that can be applied to surfaces (including hard-to-adhere-to surface such as glass, aluminum, hard plastic, etc.) by brush, as a spray, etc. Such an application may correspond to industrial (e.g., construction, aerospace, automotive, marine, grass paints, etc.), consumer (e.g., toys, household goods, consumer products, etc.), computer printer inks, etc.

Additionally, or alternatively, the Hydrophobic Binder/Adhesive described in connection with FIGS. 2A-2D, may be in the form of a flowable resin for use in developing composite materials (e.g., graphite fiber, fiber glass, etc.) for automotive, aerospace or other applications. In such applications, the Hydrophobic Binder/Adhesive may be impregnated into composite structure and cured to form components that exhibit hydrophobic characteristics.

The foregoing description provides illustration and description, but is not intended to be exhaustive or to limit the implementations to the precise form disclosed. Modifications and variations are possible in light of the above disclosure or may be acquired from practice of the embodiments.

It will be apparent that technologies and/or techniques, as described above, may be implemented in many different forms of hardware in the implementations illustrated in the figures. The actual or specialized hardware used to implement these technologies and/or techniques is not limiting of the embodiments—it being understood that hardware can be designed to implement the technologies and/or techniques based on the description herein.

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" and "an" are intended to include one or more items and may be used interchangeably with "one" or "more." Where only one item is intended, the term "one" or similar language is used. Further, the phrase "based on" is intended to mean "based, at least in part on" unless explicitly stated otherwise.

What is claimed is:

1. A hydrophobic binder/adhesive for treating a substrate comprising:
    about 60.0% to about 98.9% by weight of a bulk monomeric polymer selected from styrene, vinyl acetate, acrylic acid ester, methacrylic acid esters, ethylene and butadiene;
    about 0.1% to about 10.0% by weight of a hydrophobic monomer comprising stearyl methacrylate; and
    about 1% to about 30.0% by weight of a protective colloid comprising poly(acrylic acid-co-alpha-methylstyrene-co-styrene); wherein the combined percentage by weight of bulk polymer, hydrophobic monomer and protective colloid comprise about 100% of the hydrophobic binder/adhesive; and
    wherein the hydrophobic binder/adhesive increases resistance to wetting of the substrate when exposed to moisture.

2. The hydrophobic binder/adhesive of claim 1, comprising about 0.5% to about 3.0% by weight of the hydrophobic monomer.

3. The hydrophobic binder/adhesive of claim 1, comprising about 10.0% to about 20.0% by weight of the protective colloid.

4. The hydrophobic binder/adhesive of claim 1, where the protective colloids comprises an in-process viscosity in a range of about 100 centipoise (cP) to about 8000 cP.

5. The hydrophobic binder/adhesive of claim 4, where the one or more protective colloids comprise an in-process viscosity in a range of about 1000 centipoise (cP) to about 3000 cP.

6. The hydrophobic binder/adhesive of claim 1, wherein treating a substrate comprises coating a previously untreated substrate with the hydrophobic binder/adhesive.

7. The hydrophobic binder/adhesive of claim 1, where the substrate, treated with the hydrophobic binder/adhesive, comprise a contact angle that is greater than 90 degrees as measured between a surface comprising the substrate and a water droplet in contact with the surface.

8. The hydrophobic binder/adhesive of claim 1, where the substrate, treated with the hydrophobic binder/adhesive, comprises a first contact angle, as measured between a water droplet and a surface of the substrate with which the water droplet is in contact, that is greater than a second contact angle between a different water droplet and a surface of a substrate that is not treated with the hydrophobic binder/adhesive of claim l, with which the different water droplet is in contact.

9. The hydrophobic binder/adhesive of claim 1, where the hydrophobic binder/adhesive is formed using a surfactant free, hard resin-supported emulsion polymerization process.

10. The hydrophobic binder/adhesive of claim 1, where the substrate is treated with a composition comprising about 0.1% to about 10% of the hydrophobic binder/adhesive.

11. The hydrophobic binder/adhesive of claim 1, wherein the substrate is treated with a composition comprising about 1.0% to about 3.0% of the hydrophobic binder/adhesive.

12. The hydrophobic binder/adhesive of claim 10, where the substrate that is treated with a combination of a major amount of the conventional polymeric binder and a minor amount of the hydrophobic binder/adhesive wicks less moisture than a different substrate that is not treated with the hydrophobic binder/adhesive.

13. The hydrophobic binder/adhesive of claim 1, further comprising:
   one or more fillers selected from talc, silica, calcium carbonate, or kaolin clay.

14. The hydrophobic binder/adhesive of claim 1, wherein treating a substrate comprises impregnating a previously untreated substrate with the hydrophobic binder/adhesive.

15. The hydrophobic binder/adhesive of claim 1, further comprising a starch-based polymer.

\* \* \* \* \*